(12) United States Patent
Malecki et al.

(10) Patent No.: US 11,093,836 B2
(45) Date of Patent: Aug. 17, 2021

(54) DETECTING AND PREDICTING BOTTLENECKS IN COMPLEX SYSTEMS (71) Applicant: International Business Machines Corporation, Armonk, NY (US)

(72) Inventors: Bartlomiej T. Malecki, Slomniki (PL); Piotr Padkowski, Lodz (PL); Marek Peszt, Cracow (PL); Piotr J. Walczak, Cracow (PL)

(73) Assignee: International Business Machines Corporation, Armonk, NY (US)

(*) Notice: Subject to any disclaimer, the term of this patent is extended or adjusted under 35 U.S.C. 154(b) by 1067 days.

(21) Appl. No.: 15/182,766

(22) Filed: Jun. 15, 2016

(65) Prior Publication Data

US 2017/0364811 A1 Dec. 21, 2017

(51) Int. Cl.
*G06N 5/04* (2006.01)
*G06F 11/30* (2006.01)
*G06F 9/50* (2006.01)

(52) U.S. Cl.
CPC ............ *G06N 5/04* (2013.01); *G06F 9/505* (2013.01); *G06F 9/5027* (2013.01); *G06F 9/5088* (2013.01); *G06F 11/30* (2013.01)

(58) Field of Classification Search
CPC ....... G06N 5/04; G06F 9/5027; G06F 9/5083; G06F 9/5088; G06F 11/30; G06F 11/3003; G06F 11/3006; G06F 9/505
See application file for complete search history.

(56) References Cited

U.S. PATENT DOCUMENTS

| 7,289,947 | B2 | 10/2007 | Ammons |
| 8,104,041 | B2 | 1/2012 | Belady et al. |
| 8,225,291 | B2 | 7/2012 | Chung et al. |

(Continued)

FOREIGN PATENT DOCUMENTS

| CN | 101604287 A | 12/2009 |
| CN | 103116538 A | 5/2013 |

(Continued)

OTHER PUBLICATIONS

Battre et al., "Detecting Bottlenecks in Parallel dag-based Data Flow Programs", Technische Universitat Berlin, © 2010 IEEE, 10 pages.

(Continued)

*Primary Examiner* — James R Sheleheda
(74) *Attorney, Agent, or Firm* — Marcus Walker (57) ABSTRACT

A method for detecting a bottleneck in a system includes receiving a graph, wherein a node represents a software module and an edge represents a communication channel between software modules, monitoring selected resources for each software module in comparison to available resources, monitoring a ratio of a bandwidth consumed on a communication channel versus available bandwidth, traversing the graph for identifying a source software module whose produced amount of output is below the amount of output needed by the software module that is in idle mode, and analyzing a resource consumption of the identified source software module to identify a lacking amount of resource for the identified source software module. A computer system and computer program product corresponding to the above method are also disclosed herein.

19 Claims, 5 Drawing Sheets

(56) References Cited

U.S. PATENT DOCUMENTS

| | | | |
|---|---|---|---|
| 8,276,035 B1* | 9/2012 | Savarese | H04L 1/0007 714/749 |
| 8,738,972 B1* | 5/2014 | Bakman | G06F 11/3433 714/47.2 |
| 8,756,310 B2 | 6/2014 | Agarwala et al. | |
| 8,903,983 B2 | 12/2014 | Bakman et al. | |
| 8,954,381 B1* | 2/2015 | Naamad | G06F 3/0685 707/609 |
| 9,015,289 B2* | 4/2015 | Tseitlin | H04L 69/329 709/220 |
| 10,007,580 B2* | 6/2018 | Auvenshine | G06F 16/9024 |
| 10,320,957 B2* | 6/2019 | Cook | G06F 15/16 |
| 2004/0103189 A1 | 5/2004 | Cherkasova | H04L 65/80 709/224 |
| 2005/0075104 A1* | 4/2005 | Jain | H04W 16/14 455/423 |
| 2007/0046664 A1 | 3/2007 | Raspl | |
| 2008/0028095 A1* | 1/2008 | Lang | G06F 16/24568 709/232 |
| 2009/0300173 A1* | 12/2009 | Bakman | H04L 41/147 709/224 |
| 2010/0036810 A1* | 2/2010 | Wu | G06F 11/3423 707/706 |
| 2010/0082300 A1* | 4/2010 | Hollingsworth | G06F 3/0689 702/186 |
| 2010/0268816 A1* | 10/2010 | Tarui | G06F 9/5077 709/224 |
| 2011/0202650 A1* | 8/2011 | Abraham | H04L 47/41 709/224 |
| 2012/0109889 A1* | 5/2012 | Wu | G06F 11/3495 707/613 |
| 2012/0151053 A1* | 6/2012 | Kato | G06F 11/3447 709/224 |
| 2012/0218268 A1 | 8/2012 | Accola | |
| 2012/0260179 A1 | 10/2012 | Reshadi et al. | |
| 2013/0219057 A1 | 8/2013 | Ying | |
| 2014/0089257 A1* | 3/2014 | Ignacio | G06F 16/214 707/609 |
| 2014/0282597 A1 | 9/2014 | Garrett et al. | |
| 2015/0178129 A1 | 6/2015 | Dube | |
| 2015/0269006 A1 | 9/2015 | Caufield | |
| 2015/0373071 A1 | 12/2015 | Bin | |
| 2016/0105476 A1* | 4/2016 | Weber | H04L 67/18 370/261 |
| 2016/0191412 A1* | 6/2016 | Min | H04L 47/783 709/226 |
| 2016/0261523 A1* | 9/2016 | Razack | H04L 47/78 |
| 2017/0364811 A1* | 12/2017 | Malecki | G06F 9/5027 |

FOREIGN PATENT DOCUMENTS

| | | |
|---|---|---|
| CN | 103870374 A | 6/2014 |
| CN | 105511957 A | 4/2016 |
| JP | 2000231502 A | 8/2000 |
| WO | 2014116936 A2 | 7/2014 |

OTHER PUBLICATIONS

Gill et al., "Bottleneck Analysis and Alleviation in Pipelined Systems: A Fast Hierarchical Approach", University of North Carolina at Chapel Hill, Chapel Hill, NC 27599, USA, printed on May 26, 2016, 11 pages.

Kenney, Jim, "How performance analysis aids system design", EE Times, Apr. 11, 2003, UBM Communities, Copyright © 2016 UBM, 10 pages.

UK Examination Report dated May 25, 2021 from UK Patent Application No. GB1900356.5.

\* cited by examiner

DETECTING AND PREDICTING BOTTLENECKS IN COMPLEX SYSTEMS

BACKGROUND OF THE INVENTION

The invention relates generally to a method for detecting a bottleneck in a system, and more specifically, to a method using a graph in which a node represents a software module and an edge of the graph represents a communication channel. The invention relates further to a bottleneck identification system for detecting a bottleneck in a system, and a computer program product.

Nowadays, quite often software solutions consist of a number of inter-communicating endpoints, where many endpoints serve as data producers as well as a consumers at the same time. Poor performance on one of the endpoint/software modules may happen and typically will impact the overall performance of a complete solution. Moreover, performance of the endpoint depends not only on the hardware running it, but also on other factors like, e.g., other software modules running on the same machine, may it be a physical machine or a virtual machine. Isolating the root cause for a bottleneck in a system—in particular, with an intermitting presence—may be difficult to detect, isolate and eliminate. The reason is in the fact that a performance bottleneck may have a plurality of reasons. There may be not enough computing resources, e.g., main memory or external storage capacity, too big or too small swap files, not enough communication bandwidth, too many users trying to do the same with the same software module, etc. Even for experienced system designers and architects it may be a cumbersome task to get down to the real cause of the performance problem. The number of tools to support such analysis is still limited and often based on static information from the past. Hence, there may be a requirement for a more sophisticated support in isolating bottlenecks in a system.

SUMMARY

As disclosed herein, a method, executed by a computer, for detecting a bottleneck in a system includes receiving a graph, wherein a node represents a software module and an edge represents a communication channel between software modules, monitoring selected resources for each software module in comparison to available resources, monitoring a ratio of a bandwidth consumed on a communication channel versus available bandwidth, traversing the graph for identifying a source software module whose produced amount of output is below the amount of output needed by the software module that is in idle mode, and analyzing a resource consumption of the identified source software module to identify a lacking amount of resource for the identified source software module. A computer system and computer program product corresponding to the above method are also disclosed herein.

DETAILED DESCRIPTION

According to one aspect of the present invention, a method for detecting a bottleneck in a system may be provided. The system may comprise software modules communicating with each other via communication channels. The method may comprise receiving a graph. In the graph, a node may represent one of the software modules and an edge may represent one of the communication channels with a data flow from a transmitting software module out of the software modules to a receiving software module out of said software modules. A node, representing a software module, may serve as transmitting software module and as receiving software module and may relate to a predefined factor representing an expected ratio of a received amount of input data versus a produced amount of output data derived from the input data.

The method may further comprise monitoring, for each software module, for selected resources a ratio of an amount of the resources consumed by the software module versus an available amount of the resources, monitoring, for each communication channel, a ratio of a bandwidth consumed by one of the communication channels versus an available bandwidth on the communication channel, and an amount of idle time of the communication channel; traversing, for a software module in idle mode, the graph for identifying a source software module whose produced amount of output is below the amount of output needed by said software module that is in idle mode, and analyzing a resource consumption of the identified source software module to identify a lacking amount of resource for the identified source software module.

According to another aspect of the present invention, a bottleneck identification system for detecting a bottleneck in a system may be provided. Also, the system may comprise software modules communicating with each other via communication channels. The system may comprise a reception unit adapted for receiving a graph, in which a node may represent one of the software modules and an edge may represent one of the communication channels with a data flow from a transmitting software module out of the software modules to a receiving software module out of the software modules. A node, representing a software module, may serve as transmitting software module and as receiving software module—in particular at the same time—and may relate to a predefined factor representing an expected ratio of a received amount of input data versus a produced amount of output data derived from the input data. The system may further comprise a monitoring unit adapted for monitoring, for each software module, for selected resources, a ratio of an amount of the resources consumed by the software module versus an available amount of the resources. The monitoring unit may also be adapted for monitoring, for each communication channel, a ratio of a bandwidth consumed by one of the communication channels versus an available bandwidth of the communication channel, and an amount of idle time of the communication channel. A traversing module may be adapted for traversing, for a software module in idle mode, the graph for identifying a source software module whose produced amount of output is below the amount of output needed by the software module that is in idle mode, and an analysis module may be adapted for analyzing a resource consumption of the identified source software module to identify a lacking amount of resources for the identified source software module.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the context of this description, the following conventions, terms and/or expressions may be used:

The term 'bottleneck' may denote any negative impact in respect to the performance of a system comprising, e.g., a series of modules, some of which may be software modules. The term bottleneck may be a replacement for the term performance degradation. The reason for the performance problems may not be obvious and may require a thorough analysis.

The term 'system' may denote a group of interrelated items, like software modules, hardware components of any sort, communication units, storage elements and the like, all being part of a computing and communication system.

The term 'software module' may denote a software component being part of the system as defined above. The software module may be any sort of software module, like application software, system software, middleware software, embedded software, communication software and the like. There may be no limits to the sort of software module. The software may comprise at least an input port for receiving data and an output port for outputting data. The software module itself may transform the data in any form, store them and/or route them to an output port.

The term 'communication channel' may denote a data link connecting a data output and a data input. The data output may be an output in form of a software module and/or, alternatively, in form of a hardware module. Also a combination may be possible.

The term 'graph' may denote in mathematics, and more specifically in graph theory, a representation of a set of objects where some pairs of objects are connected by links. The interconnected objects are represented by mathematical abstractions called vertices (also called nodes or points), and the links that connect some pairs of vertices are called edges (sometimes also called arcs or lines). Typically, a graph is depicted in diagrammatic form as a set of dots for the vertices, joined by lines or curves for the edges.

The term 'node' may denote an object in the sense of the definition of the graph mentioned above. The term 'edge' may denote a link in the sense of the definition of the graph mentioned above.

The term 'transmitting software module' may denote a software module sending data from the software module. The term 'receiving software module' may denote the opposite of the term 'transmitting software module'. It may be noted that a software module may have both characteristics: transmitting and receiving at the same time.

The term 'selected resource' may denote any resource used to perform a task of an object or a link, i.e., a software module or a communication channel in the sense of the present invention and in graph theory. A selected resource may comprise and may not be limited to: available amount of memory and speed, storage, CPU power, clock speed, bus clock speed, core per CPU, number of thread per core, I/O rate, etc.

The term 'a micro-service' may denote a special form of a software module. In cloud computing software modules and complete systems may be built out of micro services, i.e., small interlinked software modules, which only comprise a partial function of the overall function.

The proposed method for detecting a bottleneck in a system as well as the bottleneck identification may offer multiple couple of advantages and technical effects:

The proposed solution may monitor continuously resources like CPU, co-processors, cache memory, main memory, I/O devices, databases, user interfaces, communication links, their amount and their availability, and the like. Beside the resources itself, also the consumption of the resources for each node and for each data flow, i.e., communication channel to/from the nodes may be monitored. A link or communication channel may be established between software modules and required resources for its proper functioning may be monitored. This way, a pretty precise picture may be drawn from resource requirements for individual activities in the system. This may be the basis for a detailed analysis of bottlenecks and their elimination. The ability to map the measured values or resource consumption against predefined values or ratios may enable a single or multiple thresholds based alarm and optimization system.

The proposed solution may identify bottlenecks in each and every component of the software components and the communication links. The root cause of performance degradation may be detected and actions may be performed to avoid such bottlenecks in the future. An operator may get active support by the proposed method and/or system for detecting bottlenecks. Due to the dynamic character of the solution, the operator does not need to rely on historic data for a performance analysis. Instead, he may be enabled by life data from the system of software modules and communication channels.

A new level of system optimization may be reached by this new approach using graph theory in order to isolate and finally eliminate system bottlenecks.

According to one preferred embodiment of the method, the node may be selected out of the group comprising a data source, e.g., a database, a data storage or, another software module, a data processing system, a data transformation system, in particular a processing software module, and a user interface module. Other optional node types may be selected from a network module, a middleware module, a storage module or the like. Thus, any component of a computing system, in particular software based nodes may be used as a source and a sink of data. Hence, the proposed solution may be adaptable to virtually every system architecture and configuration.

According to another preferred embodiment of the method, the data source may be a database, a file system, a content management system, or streaming data. The data may come in wireline-based or wirelessly. Thus, the proposed method may also be useable in a system comprising software modules linked by mobile technologies and/or cloud systems. Also embedded systems may be supported by the method.

According to one permissive embodiment of the method, at least one of the software modules may be a micro-service. Or in other words, all types of software modules may be supported as nodes of the system by the method.

According to one advantageous embodiment of the method, analyzing resource consumption may comprise tracking and reporting the lacking support of a resource over a time period. This development in time may be observed. It may be detected that the bottleneck may grow slowly over time. A time-series based analysis may help to identify the root cause of the bottleneck much faster.

According to an additionally preferred embodiment of the method, analyzing resource consumption may comprise determining a recommendation to counteract to the lacking support of a resource. For this, there may be a knowledge base provided with typical system bottlenecks known from other systems. Combinations of resource shortages of different resources may be combined and pattern matching may be applied using the actual resource measurements and those available in the knowledge base. Thus, an operator may get direct recommendations to a system optimization without doing the analysis himself.

By sharing the experiences of an elimination of a bottleneck via the knowledge base and making the so extended knowledge base available to other operators, the knowledge and know-how may be spread implying a self-learning environment of those implementations sharing the content of their knowledge bases.

According to one permissive embodiment of the method, analyzing resource consumption may comprise moving the software module to a different computing system. This may have a significant effect on the overall performance. If the different computing system may have more resources available or is completely unused, only a little communication overhead may be involved. However, if the software module is very resource intensive—e.g., because it may be a number crunching application module—and may therefore be in conflict with competing software modules on the original computing system, a transfer to a free and unused computing system may increase overall performance of a system of software modules dramatically.

According to another preferred embodiment of the method, analyzing resource consumption may comprise predicting how the system will react to changes in the resources. This may comprise the availability, amount, or speed of components or resources. It may also comprise a reflection of a change in competing software modules for a same resource. For this, it may be required that the method may comprise tracking and reporting another software module competing for the lacking resources on the same computing system. Hence, this may be a quite powerful optimization technique for eliminating bottlenecks from a system comprising a plurality of software modules.

In the following, a detailed description of the figures will be given. All instructions in the figures are schematic.

Figure 1:
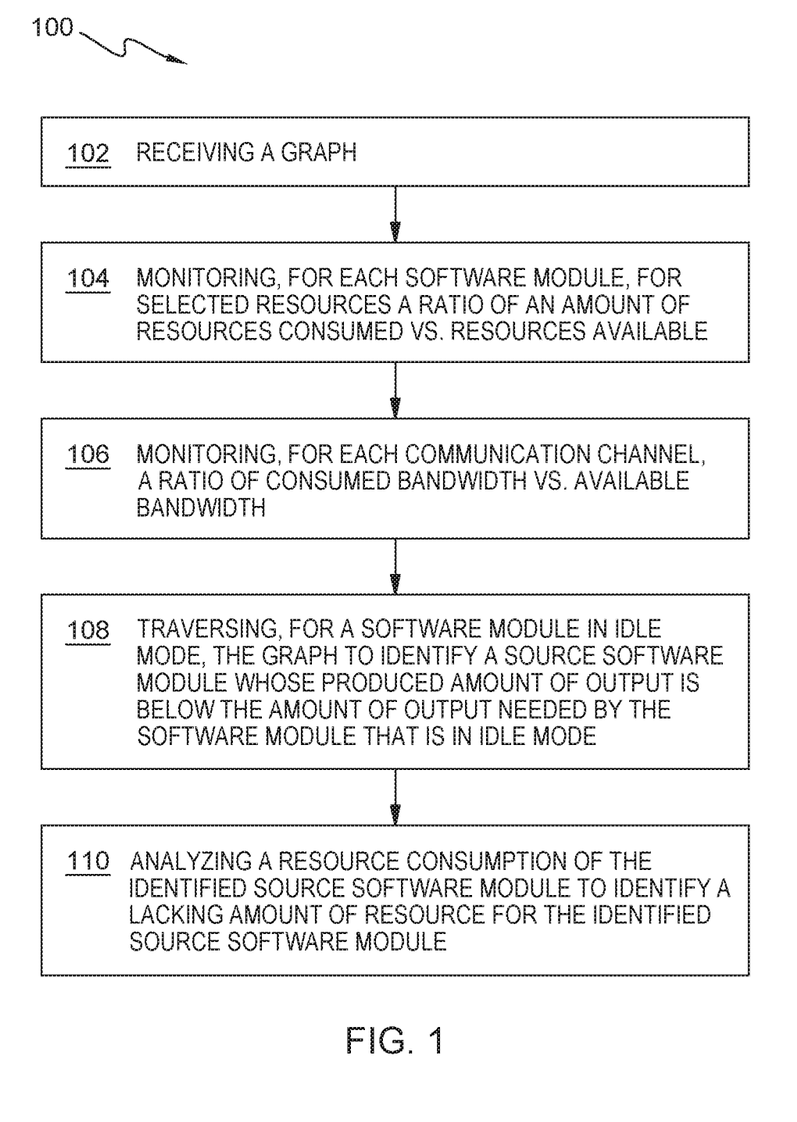
FIG. 1 is a block diagram depicting an example of the inventive method for detecting a bottleneck in a system in accordance with embodiments of the present invention.

Firstly, a block diagram of an embodiment of the inventive method for detecting a bottleneck in a system is given. Afterwards, further embodiments as well as embodiments of the bottleneck identification system for detecting a bottleneck in a system will be described.

FIG. 1 shows a block diagram of an embodiment of the method 100 for detecting a bottleneck in a system. The system may be a computer system, a computer system with attached peripheral device, a network of computers, a plurality of micro services, a complete software application system, and the like. The system comprises at least one software modules, in particular a plurality of software modules, communicating with each other via communication channels. These may be system level pipes, sockets and the like, which are well known to a skilled person. The method comprises receiving, 102, a graph. A node represents one of the software modules and an edge represents one of the communication channels with a data flow from a transmitting software module out of the software modules to a receiving software module out of said software modules. The node, representing a software module, serving as transmitting software module and as receiving software module at the same time relates to a predefined factor representing an expected ratio of a received amount of input data versus a produced amount of output data derived from the input data.

The method also comprises monitoring, 104, for each software module, for selected resources—e.g., amount of RAM, number of CPUs, cores, threads, cores, co-processor(s), other accelerators, I/O rates, parallel threads per CPU, I/O rates etc.—a ratio of an amount of the resources consumed by the software module versus an available amount of the resource.

The method may further comprise monitoring, 106, for each communication channel, a ratio of a bandwidth consumed by one of the communication channels versus an available bandwidth of the communication channel, and an amount of idle time of the communication channel, and traversing, 108, for a software module in idle mode, the graph for identifying a source software module whose produced amount of output is below the amount of output needed by the software module that is in idle mode. Last but not least, the method comprises analyzing, 110, a resource consumption of the identified source software module to identify a lacking amount of resource for the identified source software module. This way all the above-mentioned advantages may be experienced.

Figure 2:
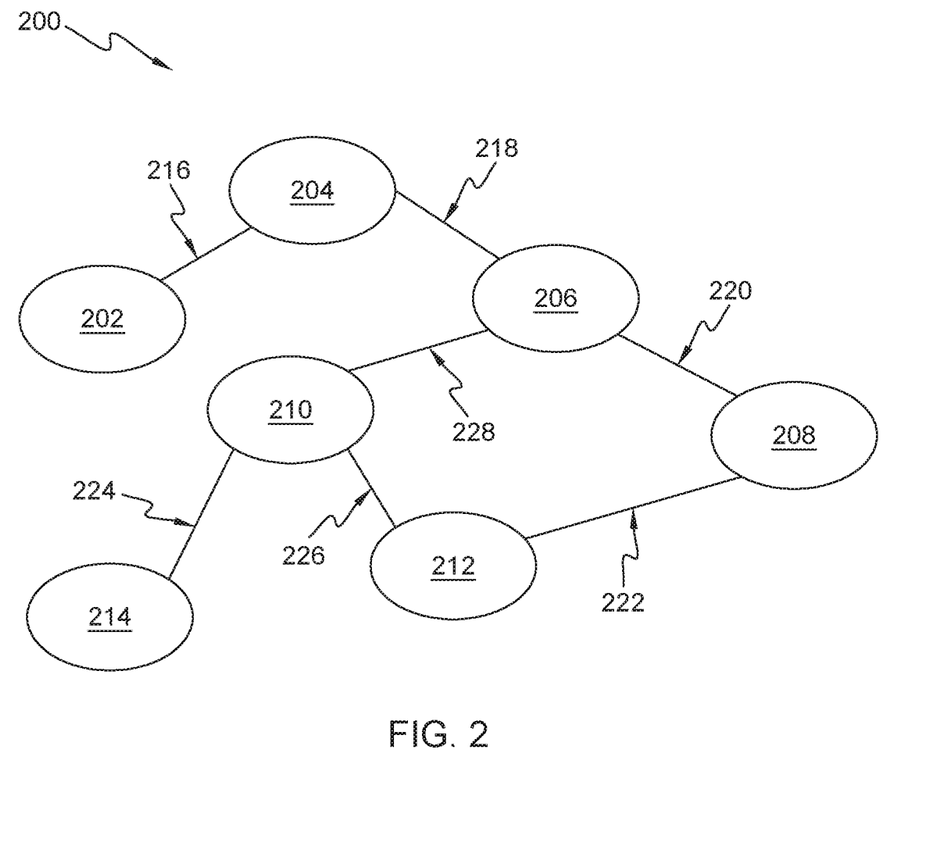
FIG. 2 is a graph depicting an example of a general model of the inventive method in accordance with embodiments of the present invention.

FIG. 2 shows an example of a graph 200 useful as a general model for the currently proposed concept. The graph 200 comprises exemplary nodes 202, 204, 206, 208, 210, 212, 214 in the sense of the mathematical concept of a graph. In-between the nodes 202, . . . , 214 are links 216, 218, 220, 222, 224, 226, and 228. The links may be interpreted as communication links or communication channels allowing a transfer of information between the nodes. The nodes may—in the context of this application—be interpreted as the software modules.

Figure 3:
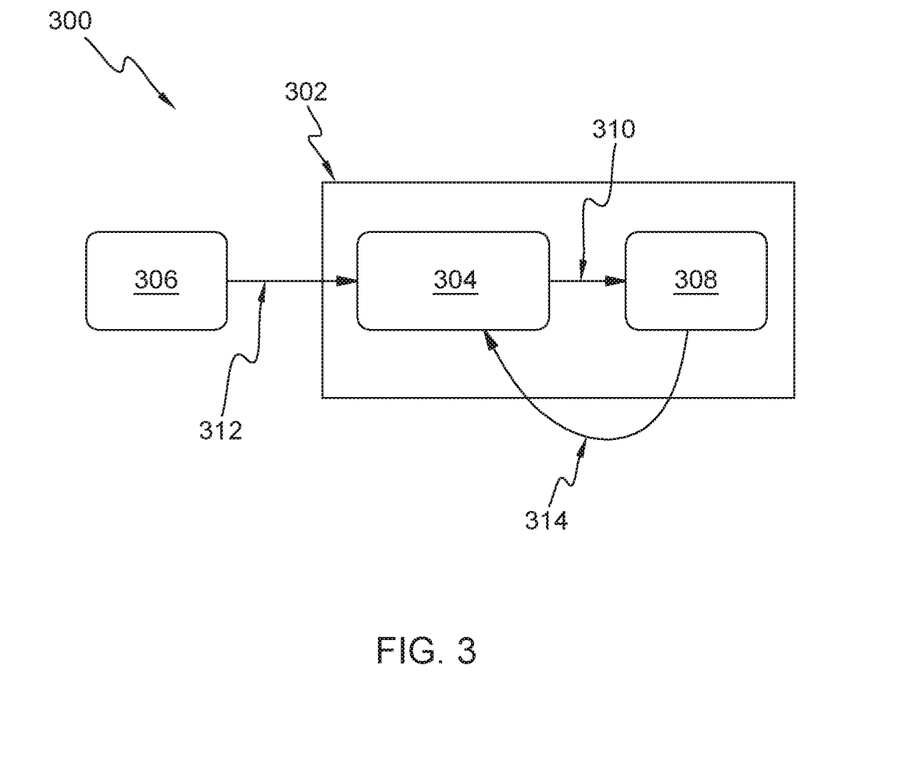
FIG. 3 is a block diagram depicting an example of a system comprising a network of elements in accordance with embodiments of the present invention.

FIG. 3 shows a block diagram of an embodiment of a system comprising a network 300 of elements. This may be viewed as an application of the graph concept to a real-life application 302.

There may be software modules represented by the reference numbers 304, 306 and 308. Software module 306 may, e.g., represent a data storage, like a database. The communication channel 312 may transfer data from a sending portion of the software module 306 to a receiving portion of software module 304. Software module 304 may represent a processing module 304 or a transactional module 304, which may send—using a sending portion—data from the processing module 304 to the software module 308, which may represent a user interface. The data may be sent using the communication channel 310.

Although this sample network of software modules being represented by the nodes 304, 306, 308 has only two communication channels 312 and 310, detecting, isolating and eliminating dynamic performance problems or bottlenecks may be quite difficult. This may also be implied by the feedback loop of the communication channel 314 from the user interface software module 308 to the transactional software module 304.

In reality, the network of interdepending software modules may be quite bigger, comprising more nodes, i.e., software modules and more links, i.e., communication channels. However, the fundamental inventive concept can be illustrated using this simpler model.

In the current embodiment, it may be assumed that the processing software module 304 and the user interface software module occupy the same machine and communicate via IPC (inter-process communication, e.g., UNIX domain sockets). It may not be required that every software module is executed on a separate computer.

The proposed solution continuously monitors resources—as mentioned above—consumption for each node or software module and data flows to/from the nodes or software modules, some of which may only be transmitters, like the database 306. Other software modules may only or mostly be receivers, e.g., the user interface software module 308.

When watching the user interface (UI) module 308 and determining that it is waiting for data, one may also determine that the processing software module 304 is also waiting for data. From this status one can determine that the UI software module 308 and the processing software module 304 are waiting for data from the database (DB) software module 306, which in turn cannot wait for data from any other component or software module because it is an endpoint of the graph 300. Therefore, the DB software module 306 has a potential bottleneck. A further examination or metrics and an analysis may reveal that the disk I/O is the resource that is utilized in almost 100% of the cases. Hence, a recommendation is generated to take action to increase the I/O rate of the resource disk relating to DB software module 306. A related message to an operator may look like this: "The DB seems to have a bottleneck component due to intensive I/O. It was detected that the second largest I/O consumer on the machine is a process called Apache (I/O utilization 10%). You may consider stopping it or limiting its resource if feasible or migrating it to another computer system."

In another example related to the same embodiment, it may be determined that the UI software module 308 is waiting and also the DB software module 306 is mostly idle. From this, the direct conclusion is made that the processing software module 304 is a potential bottleneck. Thus, the DB software module 306 can produce data faster than the processing software module 304 can consume it, and/or the UI software module 308 can receive data faster than the processing software module 304 can transmit it. A resource usage analysis reveals that the processing software module 304 is competing from RAM resources with the UI software module 308. The bottleneck identification system can then generate a message to an operator with recommendations to increase the amount of RAM or move the UI software module 308 or the processing software module 304 to another physical computer system. Based on these simplified examples and embodiments a skilled person can derive more complex scenarios.

Figure 4:
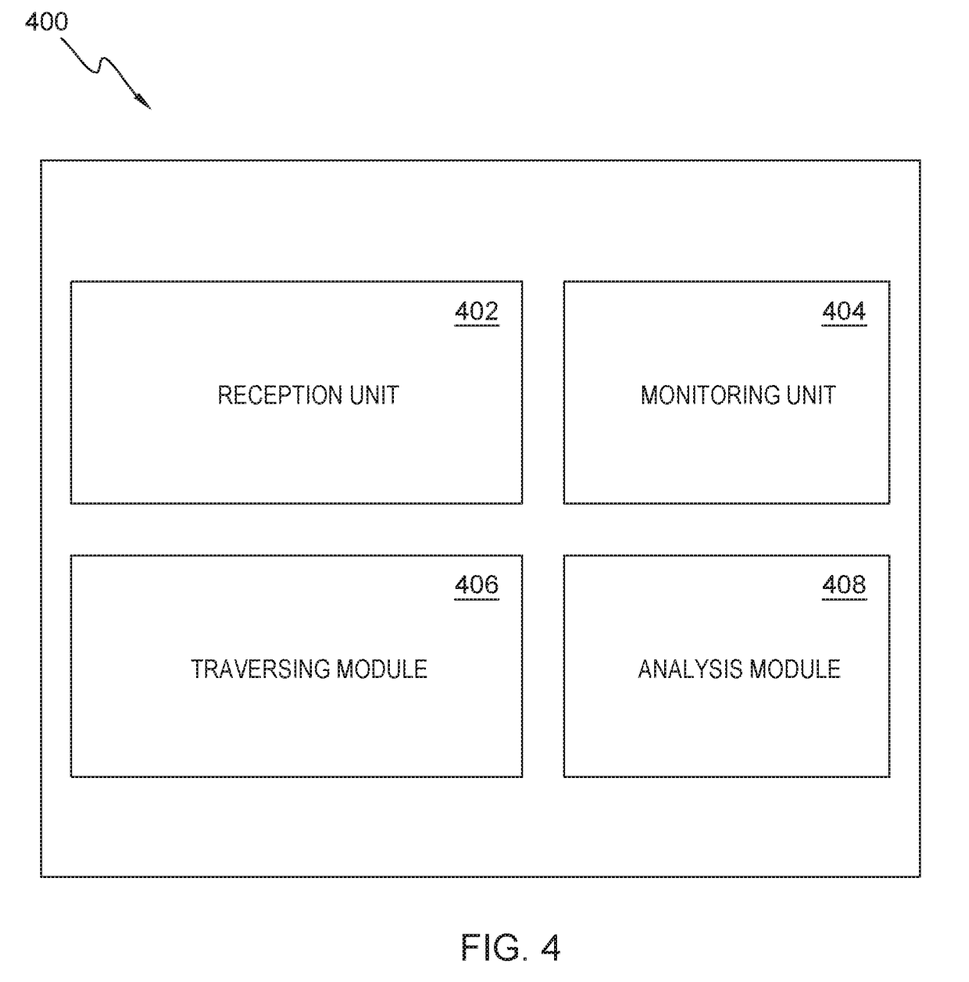
FIG. 4 is a block diagram depicting an example of a bottleneck detection system for detecting a bottleneck in a system in accordance with embodiments of the present invention.

FIG. 4 shows an embodiment of the inventive bottleneck identification system 400 for detecting a bottleneck in a system comprising software modules linked with each other via communication channels. The bottleneck identification system comprises a reception unit 402 adapted for receiving a graph. Each node represents one of the software modules and an edge represents one of the communication channels with a data flow from a transmitting software module out of the software modules to a receiving software module out of the software modules. A node may represent a software module which serves as a transmitting software module as well as a receiving software module. Each node may relate to a predefined factor representing an expected ratio of a received amount of input data versus a produced amount of output data derived from said input data.

The bottleneck identification system 400 also comprises a monitoring unit 404 adapted for monitoring, for each software module, for selected resources a ratio of an amount of the resources consumed by the software module versus an available amount of the resources. The monitoring unit 404 is also adapted for monitoring, for each communication channel, a ratio of a bandwidth consumed by one of the communication channels versus an available bandwidth on the communication channel, and an amount of idle time of the communication channel. A traversing module 406 adapted for traversing, for a software module in idle mode, the graph for identifying a source software module whose produced amount of output is below the amount of output needed by the software module that is in idle mode to keep it busy. An analysis module 408 is adapted for analyzing a resource consumption of the identified source software module to identify a lacking amount of resource for the identified source software module.

Embodiments of the invention may be implemented together with virtually any type of computer, regardless of the platform being suitable for storing and/or executing program code.

Figure 5:
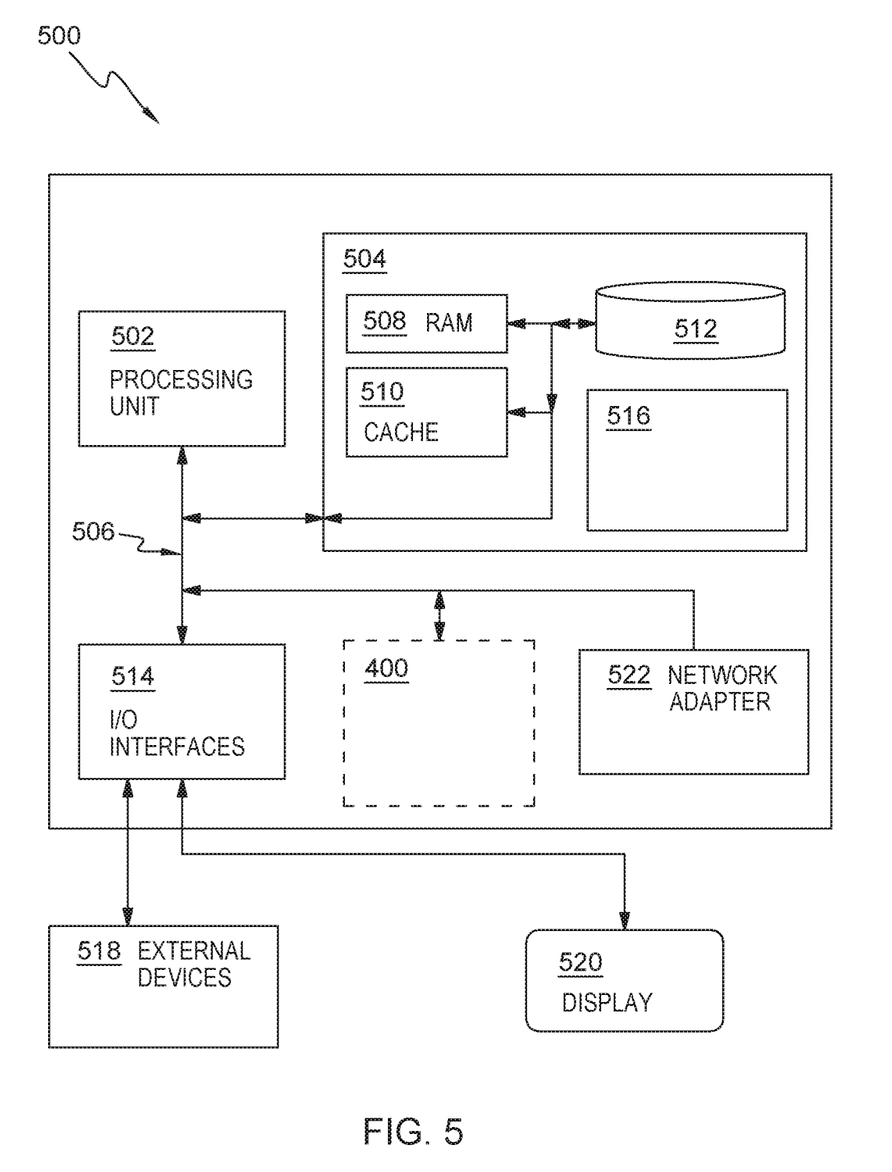
FIG. 5 shows an embodiment of a computing system comprising the system for detecting a bottleneck in a system.

FIG. 5 shows, as an example, a computing system 500 suitable for executing program code related to the proposed method. The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

Program/utility 514, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via input/output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the bottleneck identification system 400 for detecting a bottleneck in a system may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for detecting a bottleneck in a system comprising software modules communicating with each other via communication channels, said method comprising:

receiving a graph, wherein a node represents one of said software modules, and an edge represents one of said communication channels with a data flow from a transmitting software module out of said software modules to a receiving software module out of said software modules, and wherein the node, representing a software module, serving as transmitting software module and as receiving software module, relates to a predefined factor representing an expected ratio of a received amount of input data versus a produced amount of output data derived from said input data;

monitoring, for each software module, for selected resources a ratio of an amount of said resources consumed by said software module versus an available amount of said resources;

monitoring, for each communication channel, a ratio of a bandwidth consumed by one of said communication channels versus an available bandwidth of said communication channel, and an amount of idle time of said communication channel;

traversing, for a software module in idle mode, said graph for identifying a source software module whose produced amount of output is below said amount of output needed by said software module that is in idle mode, wherein identifying the source software module, further comprises:

identifying a root node of said graph, wherein the root node includes one or more branches of said graph, and wherein each software module of said software modules is associated with at least a first branch of the one or more branches;

determining a respective status of each software module of said software modules of said graph based at least in part on the data flow of said resources, wherein the respective status corresponds to a wait time associated with the data flow of said amount of output needed by each software module; and correlating the respective status of each software module of said software modules of said graph based at least in part on said amount of output needed by each software module of said software modules of said graph associated with the first branch;

analyzing a resource consumption of said identified source software module to identify a lacking amount of resource for said identified source software module, wherein analyzing the resource consumption is based at least in part on a knowledge base of combinations of resource shortages of one or more systems and pattern matching utilizing the lacking amount of resource;

identifying two or more nodes of said graph indicating that respective software modules of the two or more nodes are competing for a common resource of a computing system; and in response to determining the source software module whose produced amount of output is below a defined threshold, generating a performance degradation alarm that corresponds to the defined threshold, wherein the defined threshold is based at least in part on the predefined factor representing the expected ratio of the received amount of input data versus the produced amount of output data derived from said input data.

2. The method according to claim 1, wherein said node is selected out of the group comprising a data source, a data processing system, and a user interface.

3. The method according to claim 2, wherein said data source is a database, a file system, a content management system, or a streaming data interface.

4. The method according to claim 1, wherein at least one of said software modules is a micro-service.

5. The method according to claim 1, wherein analyzing a resource consumption comprises tracking and reporting said lacking amount of resource over a time period.

6. The method according to claim 1, wherein analyzing a resource consumption comprises determining a recommendation to counteract said lacking amount of resource.

7. The method according to claim 1, wherein analyzing a resource consumption comprises moving said software module to a different computing system.

8. The method according to claim 1, wherein analyzing a resource consumption comprises predicting how said system will react to changes in the resources.

9. The method according to claim 1, wherein analyzing resource consumption comprises tracking and reporting another software module competing for said lacking resources on said computing system.

10. A computer system for detecting a bottleneck in a system comprising software modules communicating with each other via communication channels, the computer system comprising:

one or more computer processors;

one or more computer readable storage media; and program instructions stored on the computer readable storage media for execution by at least one of the one or more processors, the program instructions comprising:

program instructions to receive a graph, wherein a node represents one of said software modules, and an edge represents one of said communication channels with a data flow from a transmitting software module out of said software modules to a receiving software module out of said software modules, and wherein the node, representing a software module, serving as transmitting software module and as receiving software module relates to a predefined factor representing an expected ratio of a received amount of input data versus a produced amount of output data derived from said input data;

program instructions to monitor, for each software module, for selected resources a ratio of an amount of said resources consumed by said software module versus an available amount of said resources;

program instructions to monitor, for each communication channel, a ratio of a bandwidth consumed by one of said communication channels versus an available bandwidth on said communication channel, and an amount of idle time of said communication channel;

program instructions to traverse, for a software module in idle mode, said graph for identifying a source software module whose produced amount of output is below the amount of output needed by said software module that is in idle mode, wherein program instructions to identify the source software module, further comprises:

program instructions to identify a root node of said graph, wherein the root node includes one or more branches of said graph, and wherein each software module of said software modules is associated with at least a first branch of the one or more branches;

program instructions to determine a respective status of each software module of said software modules of said graph based at least in part on the data flow of said resources, wherein the respective status corresponds to a wait time associated with the data flow of said amount of output needed by each software module; and program instructions to correlate the respective status of each software module of said software modules of said graph based at least in part on said amount of output needed by each software module of said software modules of said graph associated with the first branch;

program instructions to analyze a resource consumption of said identified source software module to identify a lacking amount of resource for said identified source software module, wherein analyzing the resource consumption is based at least in part on a knowledge base of combinations of resource shortages of one or more systems and pattern matching utilizing the lacking amount of resource;

program instructions to identify two or more nodes of said graph indicating that respective software modules of the two or more nodes are competing for a common resource of a computing system; and in response to determining the source software module whose produced amount of output is below a defined threshold, program instructions to generate a performance degradation alarm that corresponds to the defined threshold, wherein the defined threshold is based at least in part on the predefined factor representing the expected ratio of the received amount of input data versus the produced amount of output data derived from said input data.

11. The computer system of claim 10, wherein said node is selected out of the group comprising a data source, a data processing system, and a user interface.

12. The computer system of claim 11, wherein said data source is a database, a file system, a content management system, or a streaming data interface.

13. The computer system of claim 10, wherein at least one of said software modules is a micro-service.

14. The computer system of claim 10, wherein program instructions to analyze the resource consumption, further comprise program instructions to:
track and report said lacking amount of resource over a time period.

15. The computer system of claim 10, wherein program instructions to analyze the resource consumption, further comprise program instructions to:
determine a recommendation to counteract said lacking amount of resource.

16. The computer system of claim 10, program instructions to analyze the resource consumption, further comprise program instructions to:
Move said software module to a different computing system.

17. The computer system of claim 10, wherein program instructions to analyze the resource consumption, further comprise program instructions to:
predict how said system will react to changes in the resources.

18. The computer system of claim 10, wherein program instructions to analyze the resource consumption, further comprise program instructions to:
track and report another software module competing for said lacking resources on said computing system.

19. A computer program product for detecting a bottleneck in a system comprising software modules communicating with each other via communication channels, said computer program product comprising a computer readable storage medium having program instructions embodied therewith, said program instructions being executable by one or more computing systems to cause said one or more computing systems to:

receive a graph, wherein a node represents one of said software modules, and an edge represents one of said communication channels with a data flow from a transmitting software module out of said software modules to a receiving software module out of said software modules, and wherein the node, representing a software module, serving as transmitting software module and as receiving software module relates to a predefined factor representing an expected ratio of a received amount of input data versus a produced amount of output data derived from said input data;

monitor, for each software module, for selected resources a ratio of an amount of said resources consumed by said software module versus an available amount of said resources;

monitor, for each communication channel, a ratio of a bandwidth consumed by one of said communication channels versus an available bandwidth on said communication channel, and an amount of idle time of said communication channel;

traverse, for a software module in idle mode, said graph for identifying a source software module whose produced amount of output is below said amount of output needed by said software module that is in idle mode, wherein identifying the source software module, further comprises:
identify a root node of said graph, wherein the root node includes one or more branches of said graph, and wherein each software module of said software modules is associated with at least a first branch of the one or more branches;
determine a respective status of each software module of said software modules of said graph based at least in part on the data flow of said resources, wherein the respective status corresponds to a wait time associated with the data flow of said amount of output needed by each software module; and
correlate the respective status of each software module of said software modules of said graph based at least in part on said amount of output needed by each software module of said software modules of said graph associated with the first branch;

analyze a resource consumption of said identified source software module to identify a lacking amount of resource for said identified source software module, wherein analyzing the resource consumption is based at least in part on a knowledge base of combinations of resource shortages of one or more systems and pattern matching utilizing the lacking amount of resource;

identify two or more nodes of said graph indicating that respective software modules of the two or more nodes are competing for a common resource of a computing system; and in response to determining the source software module whose produced amount of output is below a defined threshold, generate a performance degradation alarm that corresponds to the defined threshold, wherein the defined threshold is based at least in part on the predefined factor representing the expected ratio of the received amount of input data versus the produced amount of output data derived from said input data.

* * * * *